Figure 1:
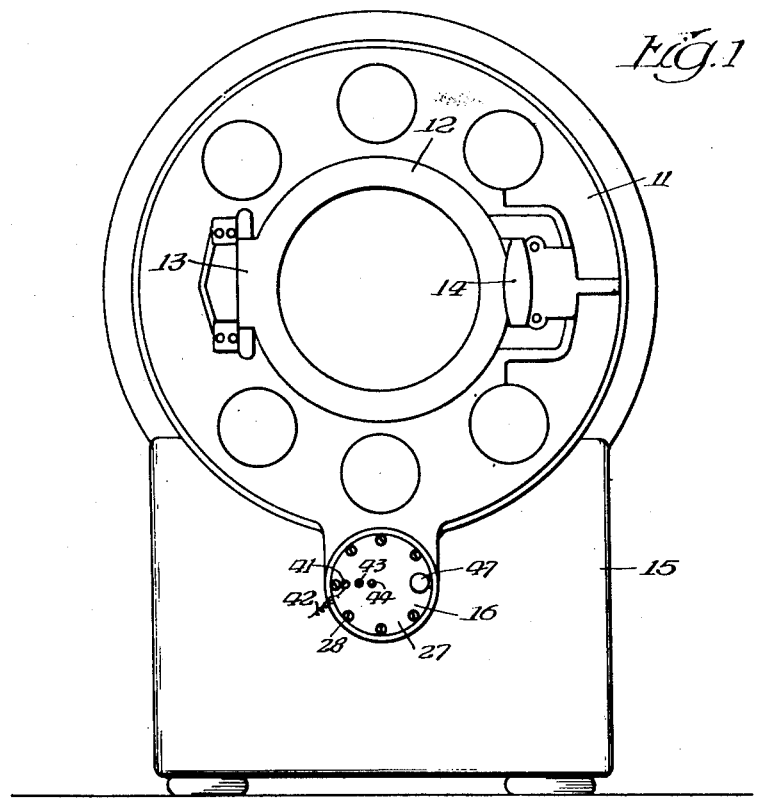

March 28, 1950  J. C. KOONZ ET AL  2,502,326
PRESSURE OPERATED SWITCH

Filed Jan. 10, 1947

Inventors:
John C. Koonz
Chester L. Piper
By Clarence J. Loftus, atty.

Patented Mar. 28, 1950

2,502,326

UNITED STATES PATENT OFFICE 2,502,326

PRESSURE OPERATED SWITCH

John C. Koonz and Chester L. Piper, Fort Wayne, Ind., assignors to The Magnavox Company, Fort Wayne, Ind., a corporation of Delaware Application January 10, 1947, Serial No. 721,220

3 Claims. (Cl. 200—83)

The present invention relates to an electric switch, and more particularly to a fluid pressure operated switch suitable for use with sequence operation systems or mechanisms.

The modern domestic washers are automatic since they are provided with a sequence operation mechanism which controls washing, rinsing and drying of clothes. The washer is provided with hot and cold water connections each operated by solenoid actuated valves. In such washers the clothes are placed within the washer which is then closed or sealed. A suitable clock mechanism is set so as to determine the length of time for the washing cycle dependent upon the type of clothes being cleaned. The main control switch is then actuated and all subsequent operations of the washer are carried out by the sequence operation mechanism including filling and emptying the washer with hot and cold water.

For proper operation of the washer it is necessary to supply the correct amount of water. To control the amount of water supplied an electric switch is employed which is so arranged as to be responsive to the water level in the washer. Commonly such switch has been located adjacent the bottom of the washer so as to be responsive to the water pressure. It has been found, however, that unless some precautions are taken the switch may be actuated prematurely by surges of liquid. It furthermore has been found that surges of water at high water levels have a relatively steep wave-front which are due to the changes in water level during the washing operation and to the rotation of paddles or vanes in the washing machine rotor. Any attempt to minimize the effect of such surges by stiffening the diaphragm of the pressure operated switch introduces a load in series with the switch which results in inconsistent operation. To minimize this defect the pressure responsive switch or element which controls the water flow has been placed in particular locations. Often such locations have been difficult to keep clean, and not infrequently the location of the switch itself was in a relatively inaccessible position so as to make it difficult to properly service the washer.

In accordance with the present invention the above mentioned disadvantages have been overcome by employing a diaphragm which has practically no load characteristics in that it does not have any appreciable amount of stiffness of its own. This eliminates the effect of a series load between the pressure responsive element and the electric switch. In one embodiment a controlled air cushion is employed which permits a regulated displacement of the air in accordance with the weight of the water in the machine, but absorbs the transient steep wave-front surges. Such an arrangement may be provided with a regulated orifice to provide the desired degree of operation. In another form of the invention it is contemplated to employ a relatively small air cushion having a constant air orifice.

It therefore is the object of the present invention to provide an improved electric switch adapted to be actuated only by sustained fluid pressure.

Another object of the present invention is to provide a fluid pressure operated switch which is not responsive to transient fluid pressure.

A still further object of the present invention is to provide an improved fluid pressure operated switch for automatic washers which may be located in any desired position for ready cleaning and servicing.

Figure 2:
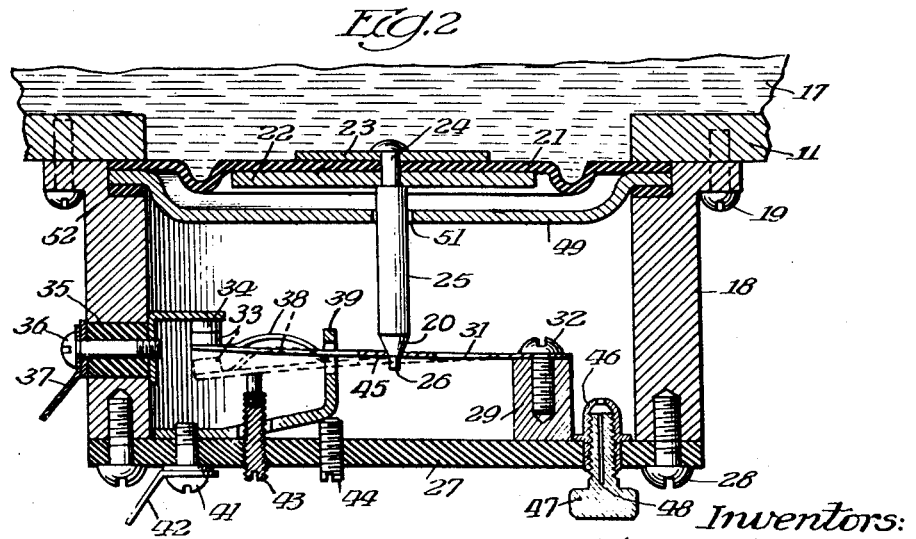

Other and further objects of the present invention subsequently will become apparent by reference to the following description taken in conjunction with the accompanying drawing wherein:

Figure 1 shows an automatic washer of the type for which the present invention is particularly suited; and Figure 2 is a cross-sectional view of the present invention as applied to an automatic washer.

In Figure 1 there is shown an automatic washer having a cylindrical tub or washing chamber 11 which is adapted to be sealed by a door 12 provided with a hinge 13 and a latch 14. The washing chamber or tub 11 is supported in a horizontal position by a casing which has a base 15. The base 15 contains or houses an electric motor and a sequence operation mechanism including the timing devices, water control valves and electric circuits. The details of such sequence operation mechanism are well known in the art and hence are not shown or described in detail.

The sequence operation mechanism within the base 15 is associated with suitable connections to hot and cold water. Each of these connections is provided with a solenoid operated valve. These solenoid operated valves are actuated at different times during the operating cycle of the washer. The valves are opened at the beginning of each washing and rinsing portion of the cycle of operation and closed whenever the water level within the washing chamber 11 has reached the proper height. A fluid responsive switch 16 is located in the proximity of the bottom or the lower portion of the washing chamber or tub 11.

The fluid responsive switch 16 is shown in detail in Figure 2 which shows a portion of the washing chamber or tub 11 containing water or cleaning fluid 17. A housing 18 is secured to the washing chamber 11 by suitable fastenings such as screws 19. The housing 18 is positioned on a suitable opening in the washing chamber 11.

To close the opening in the washing chamber 11 adjacent the housing 18 there is provided a diaphragm 21. The diaphragm 21 is provided on its outer surface with a reinforcing plate or rigid disc 22. A smaller disc 23 is provided on the inner surface of the diaphragm 21. The diaphragm and the two discs are provided with central apertures for receiving the reduced diameter portion 24 of a pin 25. The reduced diameter portion 24 after passing through the two washers 22 and 23 may be spun over or riveted to form a head. The pin or shaft 25 at its other end is provided with another reduced diameter portion 26 for engaging the electric control switch.

The housing 18 carries a cover plate 27 which preferably is formed of suitable insulating material so as to serve as a support base for the electric switch. The cover 27 is secured in position by suitable fastening means such as cap screws 28. The cover plate 27 or base for the electric switch carries a post 29 to which is secured a lever arm 31 by a suitable screw 32. The lever arm 31 at its outer extremity carries an electric contact 33 for cooperation with a stationary contact 34. The stationary contact 34 is supported from an insulation sleeve 35 in one wall of the housing 18. The support for the stationary contact 34 is retained in position by a suitable screw 36 which engages a terminal 37 for completing an electrical connection to the switch. Adjacent the outer extremity of the lever 31 there is provided a spring member 38 which engages an upright bracket 39 secured in position by a suitable screw 41 which also engages an electric terminal 42. The plate 27 is provided with two set screws 43 and 44 for determining the closing and opening pressure values of operation of the switch.

The lever arm 31 at an intermediate point is provided with an aperture 45 through which the reduced diameter portion 26 of the pin 25 passes. The aperture 45 is formed so as to have sufficient clearance for the reduced diameter pin portion 26 so as to avoid undue friction and yet serves as a guide for the lower extremity of the pin 25. The reduced diameter portion 26 is interconnected with the remainder of the pin 25 by a tapered portion 20. The taper portion 20 will always seat in the hole 45 the lever 31 at exactly the same point thereby obviating any possibility of shifting of the rod 25 with respect to the lever which otherwise would change the operation of the switch. The ability of the switch to operate repeatedly at the same pressure values is dependent upon the engagement of the switch at the same point on lever arm by the rod 25. The switch contacts 33 and 34 are opened and closed by a snap action.

In accordance with one embodiment of the present invention it is contemplated to cause the diaphragm 21 to act against an air cushion. This air cushion is contained within the chamber formed by the housing 18. The sharp wave-front surges compress the air within the housing 18. The compression of the air therefore is sufficient to absorb the effect of transient water surges. In accordance with the water level in the washing chamber, however, the diaphragm 21 will be displaced a certain distance. It is desired to permit a certain regulated flow of air in and out of the chamber formed by the housing 18. In certain types of washers it is desired to provide a means whereby the flow of air out of the chamber formed by the casing 18 is regulated. Accordingly an adjustable valve casing 46 is provided with a needle valve 47. The needle valve 47 carries a slot 48 to permit the air to flow back and forth in accordance with the adjustment of the needle 47. The trapped air within the chamber therefore serves to absorb by compression the transient surges and yet permits the displacement of the diaphragm in accordance with the average water pressure due to the level of water in the washing chamber.

Another feature of the present invention is the provision of a relatively small air chamber immediately adjacent the outer surface of the diaphragm 21. This air chamber is provided by a dished member 49 having a central aperture 51. The aperture 51 is so arranged as to provide a predetermined regulated air passage for the air trapped between the member 49 and the diaphragm 21. The flange of the member 49 is immediately adjacent the outer flange of the diaphragm 21 and a suitable sealing ring or gasket 52 may be provided between these members and the housing 18. This arrangement provides a minimum volume of air in a chamber to minimize or reduce the movement of the diaphragm due to transient effects such as surging cleaning fluid. The clearance in the aperture 51 permits the push rod 21 to operate the switch without introducing any additional friction and at the same time to serve as a limiting orifice to restrict the flow of air in and out of the trapped air chamber.

It has been found that the surging forces which operate in a washer of this type are quite violent but of very short duration. Since the displacement of a diaphragm which acts to form one boundary of a given volume of air will upon the application of a given force move through a distance directly proportional to the volume of the enclosed air, it is desired to trap a relatively small volume of air and at the same time allow sufficient motion of the diaphragm to operate an electric switch in accordance with predetermined pressures. In the present instance the air trapped between the diaphragm 21 and the member 49 operates to a considerable extent as a non-variable volume when confronted with the sharp impulses due to surges but at the same time acts as a variable air volume when confronted with the slower acting steady pressure change represented by the level of fluid in the washing machine. In certain types of washing machines it has been found sufficient to employ only the arrangement last described thereby dispensing with the controlled needle valve type of adjustment provided by the members 46, 47 and 48. While for certain washing machines the adjustable needle valve has been found best suited to control the operating conditions, it will of course be appreciated that either one or both of the arrangements heretofore described may be employed in controlling the operation of a switch which is to be responsive to the fluid pressure in a washing machine.

While for the purpose of illustrating and describing the present invention, a preferred embodiment has been shown in the drawing, it is to be understood that the invention is not to be limited thereby since such variations in the components employed and in their arrangement are contemplated as may be commensurate with the spirit and scope of the invention set forth in the following claims.

We claim:

1. A fluid pressure actuated switch comprising a relatively flexible diaphragm having a reinforced stiffened central portion, said diaphragm being arranged to have one surface exposed to fluid pressure, a snap-action electric switch having one contact carried by a lever arm, said arm having an aperture therein, adjustable means for determining the pressure values at which said arm will be actuated in response to said pressures, an air chamber having one rigid wall and arranged to have one surface of said diaphragm as a portion of its other wall, a restraining aperture in said rigid wall, and a rod secured to said diaphragm; said rod extending through and fitting closely within the aperture to restrain the flow of air through said aperture, said rod having a reduced diameter portion passing through the aperture in said lever to interconnect said switch with said diaphragm, and means comprising a tapered portion on said rod seating in the aperture of the lever to prevent shifting of the rod with respect to the lever.

2. A fluid pressure actuated switch comprising a diaphragm having a relatively flexible periphery and a rigid central portion, a housing for supporting said diaphragm so that one surface is subjected to fluid pressure, a snap-action electric switch carried by said housing and having one contact carried by a lever arm, adjustable means for determining the pressure values at which said lever arm will be actuated in response to certain pressures, a rod secured to said diaphragm and arranged to engage said switch lever arm, and an adjustable needle valve interconnecting the interior and exterior of said housing.

3. A fluid pressure-actuated switch comprising a relatively flexible diaphragm, said diaphragm being arranged to have one surface exposed to fluid pressure, a snap action electric switch having one contact carried by a lever arm, said arm having an aperture therein, adjustable means for determining the pressure values at which said lever arm will be actuated in response to certain pressures, an air chamber arranged to have one surface of said diaphragm as a portion of its wall, a rod secured to said diaphragm and having a reduced diameter portion passing through the aperture in said lever to interconnect said switch with said diaphragm, and means comprising a tapered portion on said rod seating in the aperture of the lever arm to prevent shifting of the rod with respect to said lever.

JOHN C. KOONZ.
CHESTER L. PIPER.

REFERENCES CITED

The following references are of record in the file of this patent:

UNITED STATES PATENTS

| Number | Name | Date |
|---|---|---|
| 1,306,007 | Hack | June 10, 1919 |
| 1,960,020 | McGall | May 22, 1934 |
| 2,033,410 | Dezotell | Mar. 10, 1936 |
| 2,075,305 | Sayre | Mar. 30, 1937 |
| 2,230,113 | Hein | Jan. 28, 1941 |
| 2,270,608 | Sandberg | Jan. 20, 1942 |
| 2,428,096 | Reavis | Sept. 30, 1947 |